June 10, 1930.　　G. D. DUNCAN, JR　　1,763,423
PORTABLE SWIVEL TRUCK CONVEYER
Filed Aug. 3, 1928　　2 Sheets-Sheet 1
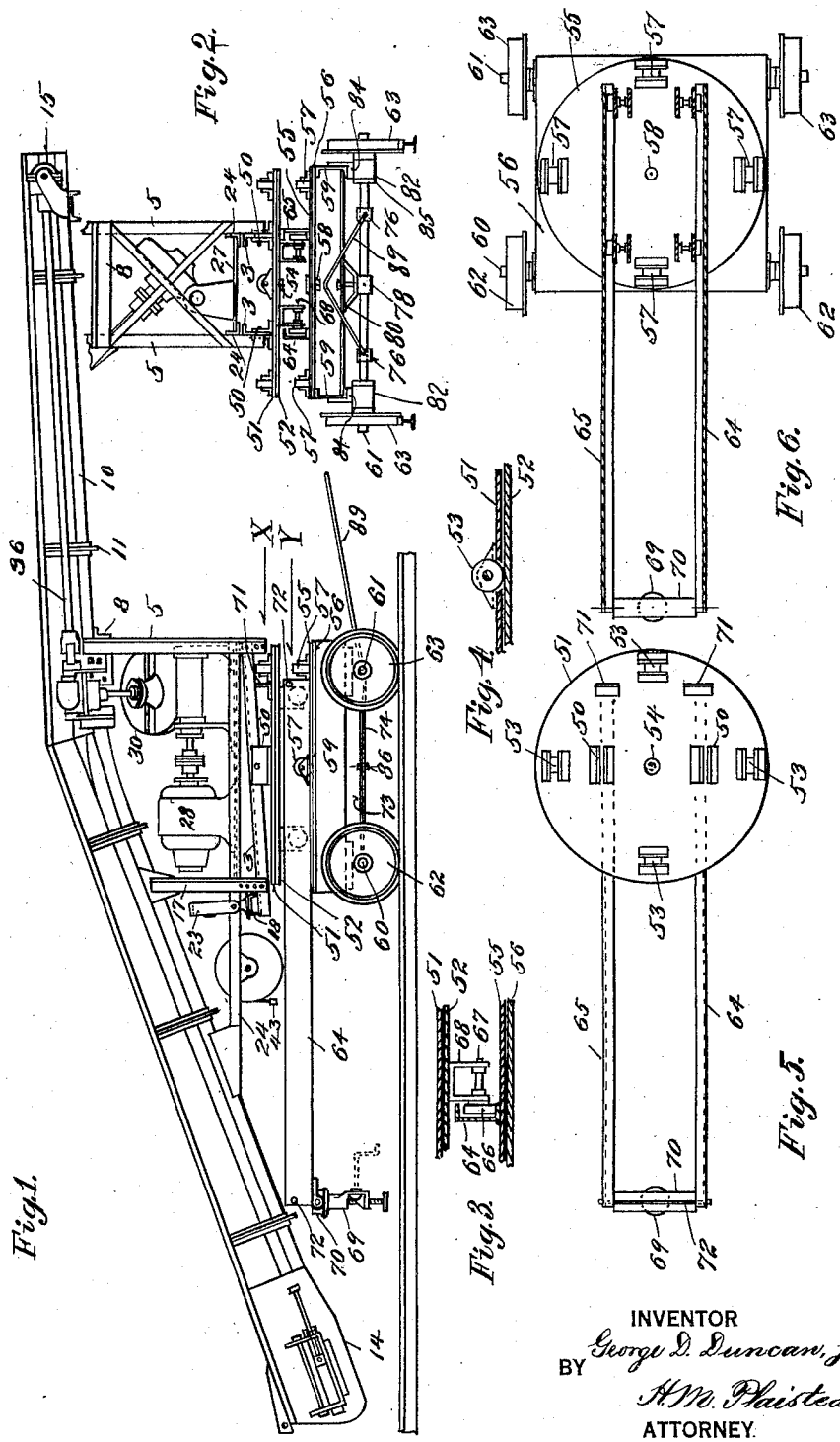
INVENTOR
George D. Duncan, Jr.
BY
H. M. Plaisted
ATTORNEY June 10, 1930.  G. D. DUNCAN, JR  1,763,423
PORTABLE SWIVEL TRUCK CONVEYER
Filed Aug. 3, 1928  2 Sheets-Sheet 2
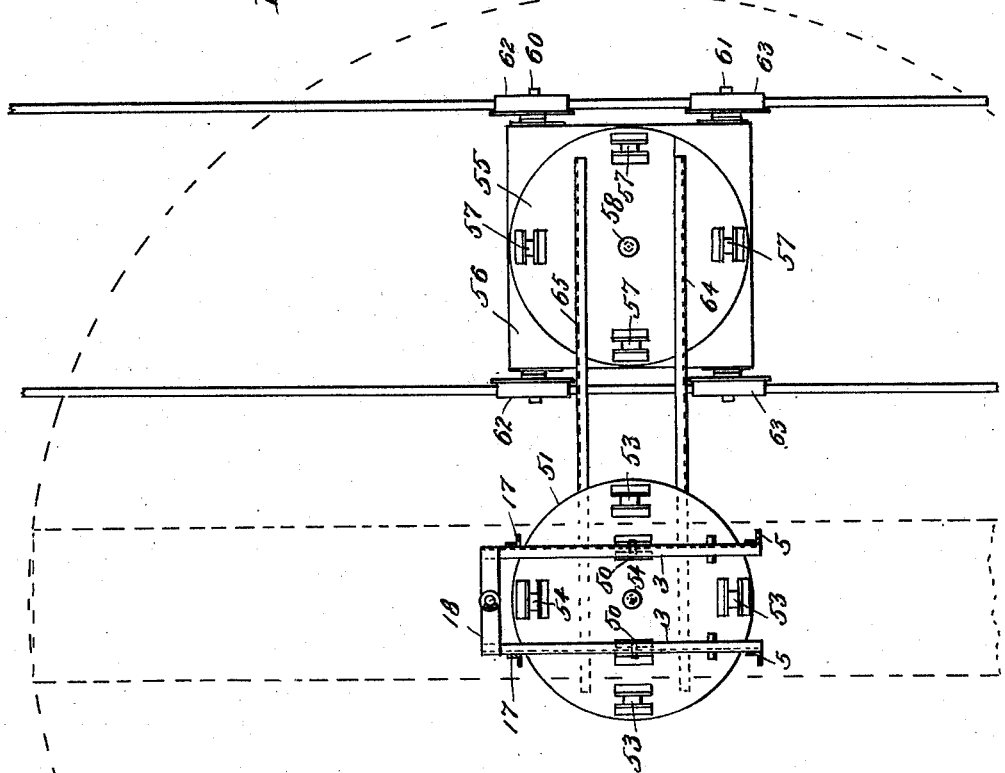
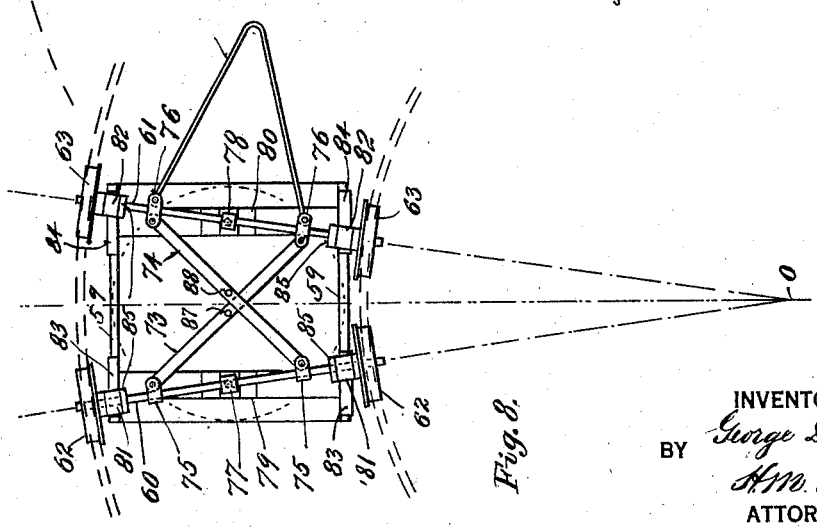
INVENTOR
George D. Duncan, Jr.
BY
H. M. Plaisted,
ATTORNEY.

Patented June 10, 1930

1,763,423

UNITED STATES PATENT OFFICE

GEORGE D. DUNCAN, JR., OF ALTON, ILLINOIS, ASSIGNOR TO DUNCAN FOUNDRY AND MACHINE WORKS, INC., OF ALTON, ILLINOIS, A CORPORATION OF ILLINOIS

PORTABLE SWIVEL-TRUCK CONVEYER

Application filed August 3, 1928. Serial No. 297,171.

This invention relates to certain new and useful improvements in portable swivel truck conveyers, the peculiarities of which will be hereinafter fully described and claimed.

The main objects of my invention are to mount a conveyer with its frame and operative mechanism pivotally upon a carrying truck so as to be able to swing the conveyer frame and its mechanism about a translatable support operatively connected to said truck; secondly, to provide operative connections between said support and truck so that said support with the conveyer frame and its operative mechanism mounted thereon, can be translatively moved various distances from the truck, and also swing about said support at convenient angles for operation of the conveyer; thirdly, to provide a turntable— or its equivalent—on the truck, a turntable— or its equivalent—for the conveyer itself, and interposed means for horizontal radial travel of one turntable with respect to the other; and fourthly, to other features of construction and arrangement hereinafter described and claimed.

When a conveyer on a pair of carrying wheels on an axle fixed to the conveyer is pushed around a sharp curve in a mine track, the wheels bind and retard progress till the rear end of the conveyer is pulled laterally to straighten the wheels on the track. In some cases the pillars or walls interfere with this lateral movement of the rear end. To overcome such difficulties, I have illustrated herein a pivotal mounting of the conveyer frame and its operative mechanism upon a truck having a short wheel base adapted for sharp curves. Also I have shown a construction whereby such pivotally supported conveyer frame and operative mechanism can be set off radially from the truck in any convenient direction, and allow of loading a car on a track adjacent to the one the truck is on, for example.

Also my construction is adapted to allow of loading from a larger field than would be practical if the conveyer were pivoted permanently on the truck or other carriage.

In other words, my turntable support for the conveyer frame and its operative mechanism can be brought over a turntable on the truck so that the vertical axes coincide, and swung about such common axis and be operated in any position; or, the upper turntable with the conveyer frame and mechanism thereon can be set off radially in any desired direction by means of an interposed swinging frame on which the upper turntable is adapted to travel, and then operated over a larger field than in the previous adjustment. By suitable elevating mechanism, vertical adjustments can also be made in any of said radial locations.

In the accompanying drawings in which like reference numerals indicate corresponding parts, Fig. 1 represents a side view of a portable conveyer embodying my improvements;

Fig. 2, an end view of part of Fig. 1;

Fig. 3, a detail in larger scale of a wheel mounting in the swinging frame;

Fig. 4, a similar detail of a roller in a turntable;

Fig. 5, a plan view of the upper turntable and swinging frame on the horizontal plane X of Fig. 1;

Fig. 6, a plan view of the lower turntable and section of the swinging frame on the horizontal plane Y of Fig. 1;

Fig. 7, a plan view of the upper turntable set off laterally on the swinging frame, with the superposed conveyer frame and the circular field it is adapted to cover in this adjustment, indicated by dotted lines; and Fig. 8, a reversed plan view of a truck construction especially adapted for sharp curves.

Referring to the drawings, a drag conveyer is mounted in an inclined conveyer frame comprising sides 10 with braces 11 and boot 14, and supported by a cross bar 8 on a pair of vertically disposed posts 5 to which are fastened horizontally disposed platform beams 24, having their other ends fastened to the conveyer frame.

A platform 27 supports a motor 28 and worm gear reducer housing 30 operatively connected to a shaft 36 mounted alongside the conveyer frame and adapted to drive the drag conveyer from the discharge end 15, when a plug 43 on a cable connected to said motor is cut in to an electric current. A pair of levers 3 have one end adjustably connected to said posts 5, and have a cross beam 18 at their other ends on which is mounted a screw jack adapted to press upward against a bail or stirrup 23 pivoted to the platform beams near posts 17, and thus depress the cross beam and adjacent ends of said levers to adjust the conveyer frame vertically. Other elevating means may be employed. The swinging frame fixed to the upper disc of the truck turntable, travels with the truck and is swung outward wherever the truck is stopped for the translation of the conveyer frame and its mechanism to any desired operative position with regard to the coal to be handled. When the conveyer is to pass a restricted opening the horizontally swinging frame fixed to the lower turntable, is swung under the conveyer frame and in line therewith, as shown in Fig. 1.

In the present application, the said levers 3 are pivotally fulcrumed in brackets 50 on a disc 51 rotatably mounted on a lower plate 52 preferably by supporting rollers 53 in brackets above the disc. The rollers project down through openings in the disc into contact with the lower plate on which they track and, with a center pin 54, form a turntable.

Another lower turntable is formed by a disc 55 rotatably mounted on a track plate 56 by similar rollers 57 and center pin 58, or otherwise. This lower turntable is supported on a short truck, preferably consisting of channel sides 59 on axles 60 and 61 having respective carrying wheels 62 and 63, flanged for track rails, or otherwise.

Between these upper and lower turntables is mounted a rectangular frame preferably consisting of channel beams 64 and 65 fastened to the disc 55 of the lower turntable, and projecting therefrom radially—or otherwise—a definite distance and overhanging the truck. This frame is thus adapted to swing about the center 58 of the lower turntable with the disc 55, and project therefrom horizontally in any convenient direction.

On this interposed swinging frame is movably mounted the upper turntable carrying the conveyer frame and operative mechanism, preferably by means of wheels 66 on shafts 67 mounted in webs 68 depending from the lower plate 52 of the upper turntable, and adapted to travel on the lower flanges of said channel beams 64 and 65 (Fig. 6), between cross rods 72 forming end stops.

The overhanging end of this swinging frame is braced by a screw jack 69 depending from a pivoted cross bar 70, or by other means for bracing said end from the uneven ground.

The pivotal fulcrum of the supporting levers 3 in the brackets 50, allows the conveyer frame to oscillate in a vertical plane. The boot end is somewhat heavier than the discharge end, and the latter end can be overbalanced and depressed on the fulcrum pivot so that the levers rest on stops 71 on the disc 51 (Fig. 5).

In this position, with the swinging frame swung under the conveyer frame and the two turntables practically concentric, the machine is in its most compact condition and adapted to pass a restricted opening. The truck with its short wheel base and the conveyer frame and mechanism mounted thereon, is the more readily pushed through such opening, or around a sharp curve.

Furthermore, the swinging frame can be swung outward laterally, and the upper turntable with all its supports can be pushed outward on the swinging frame to the end as shown in Fig. 7, or to any intermediate position.

The boot end of the conveyer can be swung in an arc about the center of the upper turntable, as indicated in Fig. 7, and serve a large area. The swinging frame can be swung to either side of the track, and in any other radial direction from the truck, and thus serve an increased area. This enlarged area capacity is combined with the portable feature of the truck mounting, by which the conveyer covers successive areas as it is pushed along the track rails.

In practical use, the swinging frame is first swung out radially and braced as described, and then the conveyer turntable is moved outward thereon to the desired position parallel to—or inclined, or across—the track.

By means of the elevating lever beams and operative connections between the truck and conveyer, the latter can be adjusted in a vertical plane; by means of the pivotal mounting on a vertical axis, it can be adjusted also in a horizontal plane with the truck as a center (as in Fig. 1); and by means of the traveling upper turntable, it can be adjusted in a horizontal plane of enlarged area, and also in various vertical planes through the center of its traveling turntable by the elevating means stated.

The lower turntable and swinging frame may be omitted and the upper turntable with superposed conveyer and mechanism be mounted directly on the truck, and obtain the vertical and the swinging adjustments of the conveyer frame, but without the largely increased area capacity due to the radially travelling turntable in the preferred construction shown and described.

In order further to facilitate turning this conveyer on sharp curves of the mine track or elsewhere, the axles 60 and 61 are connected by diagonal cross bars 73 and 74, independent of each other and pivotally mounted in jaw collars 75 and 76 (or other means) on the respective axles near the truck sides, as shown in Fig. 8. These collars are clamped on the axles—or otherwise prevented from moving lengthwise under stress. A forwardly extending tongue 89 is fastened to the front axle 61 by the double jaws of the collars 76, or otherwise, to turn or guide the wheels of the front axle, and thus oppositely incline the rear axle through the said diagonal cross bars.

Each axle has a central collar 77 and 78 with pivot pin extending upward through its respective transom 79 and 80 (Fig. 2), and the freely swinging ends of the axles are preferably provided with rotatable sleeves 81 and 82, adapted to roll on bearing plates 83 and 84 at the sides of the truck. The sleeves are held from translation by the adjacent wheel hubs and collars 85, or other means.

When going around a curve, it is thus comparatively easy to maintain the axles in radial positions with regard to the center O of the curve (Fig. 8), and thus avoid binding of the wheel flanges on the gauge sides of the rails.

This adjustable truck construction also facilitates turning the conveyer and guiding it in travel otherwise than on the track rails such as travel along roads or entering and leaving a building, as the conveyer with its overhanging ends is more readily changed in its traveling direction by means of the inclinable axles shown and described.

Whenever it is desired to maintain the axles parallel to each other, a bolt 86 (Fig. 1) is inserted in holes 87 and 88 located midway of the ends of the respective bars, which holes match only when the axles are parallel. Other means may be employed to lock the axles in parallel position. Together with said pivotal mounting of the conveyer frame and the radial shifting of one turntable with regard to the other, this portable conveyer is readily handled in practically every situation arising in its use and operation.

I claim:

1. A portable conveyer comprising a truck, a conveyer frame and operative mechanism, a turntable support therefor, vertically adjustable means for said frame mounted on said turntable, supporting wheels and shafts for said turntable, a horizontal rectangular frame pivotally mounted on and extending beyond said truck forming a swinging track for said wheels, and an adjustable brace for the outer overhanging end of said swinging track.

2. A portable conveyer comprising a truck, a turntable mounted thereon, horizontal beams carried by said turntable extending radially therefrom forming a swinging frame overhanging the truck, an adjustable brace for said overhanging frame, an upper turntable movably mounted to travel on said frame, a conveyer frame carried by said upper turntable, and means to effect vertical adjustment of said conveyer frame.

3. A portable conveyer comprising a truck, a conveyer frame, two turntables, the lower one carried by said truck and having a horizontally swinging frame extending beyond the truck, and the upper one being movably mounted to travel on said swinging frame and supporting said conveyer frame, and a screw jack depending from a pivoted bar at the outer end of said swinging frame adapted to brace the frame from the ground.

4. A portable conveyer comprising a truck, a conveyer frame, a turntable supporting said frame, a turntable on said truck, and a horizontally swinging frame carried by one turntable on which the other is movably mounted, said turntables each consisting of a lower plate and an upper disc plate having openings near the periphery, and rollers mounted in brackets above the disc and projecting down through said openings into contact with the lower plate, substantially as described.

5. A portable conveyer comprising a truck, a turntable mounted thereon, horizontal supporting means connected to said turntable extending outward therefrom and swinging therewith, means to support the outer end thereof in any swung position, an upper turntable translatably mounted on said supporting means, and a conveyer frame and its operative mechanism carried by said upper turntable, substantially as described.

6. A portable conveyer comprising a truck, a conveyer frame and its operative mechanism, a turntable support for said frame and mechanism, a lower turntable on the truck, and interposed means for horizontal radial travel of one turntable with respect to the other, substantially as described.

7. A portable conveyer comprising a conveyer frame and its operative mechanism, a turntable supporting said frame and mechanism, a lower turntable and a truck on which it is mounted, and interposed horizontally projecting supporting means for the upper turntable and fixed to the lower table to swing therewith and on which the upper table is translatably mounted, said interposed supporting means being adapted to swing under the conveyer frame to pass restricted openings, substantially as described.

In testimony whereof I have affixed my signature.

GEORGE D. DUNCAN, Jr.